US006880654B2

(12) United States Patent
Plishner

(10) Patent No.: US 6,880,654 B2
(45) Date of Patent: Apr. 19, 2005

(54) VEHICLE WITH A DISTRIBUTED MOTOR

(76) Inventor: Paul J. Plishner, 42 Foster Crossing, Southampton, NY (US) 11968

( * ) Notice: Subject to any disclaimer, the term of this patent is extended or adjusted under 35 U.S.C. 154(b) by 75 days.

(21) Appl. No.: 10/419,689

(22) Filed: Apr. 21, 2003

(65) Prior Publication Data

US 2004/0124023 A1 Jul. 1, 2004

Related U.S. Application Data

(60) Provisional application No. 60/458,651, filed on Mar. 28, 2003.

(51) Int. Cl.[7] ............................................. B60K 1/02
(52) U.S. Cl. ..................... 180/65.6; 180/209; 180/242; 180/65.5
(58) Field of Search ............................. 180/65.5, 65.1, 180/65.3, 65.6, 65.7, 65.8, 170, 197, 233; 701/22, 69, 70, 71, 89, 93

(56) References Cited

U.S. PATENT DOCUMENTS

| | | | | |
|---|---|---|---|---|
| 3,477,537 A | | 11/1969 | Plishner ....................... 180/65 |
| 3,966,220 A | * | 6/1976 | Forsyth et al. ............... 280/638 |
| 4,191,274 A | | 3/1980 | Goldberg et al. |
| 4,363,999 A | * | 12/1982 | Preikschat ..................... 318/53 |
| 4,371,191 A | | 2/1983 | Goldberg et al. |
| 4,570,741 A | * | 2/1986 | McCoy ......................... 180/242 |
| 5,222,568 A | * | 6/1993 | Higasa et al. ............... 180/65.5 |
| 5,224,563 A | * | 7/1993 | Iizuka et al. ................ 180/65.3 |
| 5,418,437 A | * | 5/1995 | Couture et al. .............. 318/139 |
| 5,632,534 A | * | 5/1997 | Knechtges ................... 303/152 |
| 5,746,283 A | | 5/1998 | Brighton ..................... 180/65.3 |
| 5,762,156 A | | 6/1998 | Bates et al. ................. 180/65.3 |
| 5,765,656 A | | 6/1998 | Weaver ........................ 180/165 |
| 5,813,487 A | * | 9/1998 | Lee et al. .................... 180/65.1 |
| 5,826,673 A | | 10/1998 | Bates et al. .................. 180/165 |
| 5,991,683 A | * | 11/1999 | Takaoka et al. ............. 701/102 |
| 6,148,942 A | * | 11/2000 | Mackert, Sr. ............... 180/65.6 |
| 6,213,234 B1 | | 4/2001 | Rosen et al. ................ 180/65.3 |
| 6,634,654 B1 | | 10/2003 | Mäckle et al. |
| 6,688,412 B1 | * | 2/2004 | Kima et al. ................. 180/65.5 |
| 6,722,676 B1 | | 4/2004 | Zadok |

OTHER PUBLICATIONS

Spectrum Online (www.spectrum.ieee.org), Top 10 Tech Cars—Here Come the Hybrids by John Voelcker, Wed. Mar. 17, 2004 11:36—500 GMT (as published on the Internet).
Spectrum Online (www.spectrum.ieee.org), U.S. Military Goes for Hybrid Vehicles by Peter Fairley (as published on the Internet).

* cited by examiner

Primary Examiner—Christopher P. Ellis
Assistant Examiner—Jeff Restifo
(74) Attorney, Agent, or Firm—Ware, Fressola, Van Der Sluys & Adolphson LLP

(57) ABSTRACT

A motorized vehicle having a distributed motor system, i.e. having a plurality of electric drive motors (12) each coupled to a respective traction wheel (10a), all under the control of a controller (13). All or only some of the wheels may be traction wheels (10a), and each traction wheel (10a) may also have a steering motor (21a), and each may even also have a wheel positioning motor (27) for repositioning the wheel relative to the chassis (10c), e.g. during a turn. Each electric drive motor (12), steering motor (21a) and wheel positioning motor (27) may be integrated into a wheel manipulator element (31), with all wheel manipulator elements (31) operative according to signals received from the controller (13) and using power provided via the controller (13). Each wheel manipulator element (31) typically provides the controller (13) with signals indicating the motion of the respective wheel (10a).

15 Claims, 4 Drawing Sheets

VEHICLE WITH A DISTRIBUTED MOTOR

CROSS REFERENCE To RELATED APPLICATION

Reference is made to and priority claimed from U.S. provisional application Ser. No. 60/458,651, filed Mar. 28, 2003, and entitled VEHICLE WITH A DISTRIBUTED MOTOR.

FIELD OF THE INVENTION

The present invention pertains to the field of motor-driven vehicles, including automobiles. More particularly, the present invention pertains to an arrangement of electric drive motors for driving such vehicles.

BACKGROUND OF THE INVENTION

Electric cars and other electric-motor driven vehicles are known in the art, including so-called hybrid vehicles which use one or another combination of electric motor and fossil-fuel powered motor, which is in some cases a gas turbine, such as disclosed in U.S. Pat. No. 3,477,537, for an ELECTRIC MOTOR-DRIVEN AUTOMOBILE, issued Nov. 11, 1969, to the inventor of the present invention. Later patents disclosing subject matter in the same are include: U.S. Pat. No. 6,213,234 to Rosen et al., for a VEHICLE POWERED BY A FUEL CELL/GAS TURBINE COMBINATION; U.S. Pat. No. 5,826,673 to Bates et al., for a HYBRID ELECTRIC PROPULSION SYSTEM USING A DUEL SHAFT TURBINE ENGINE; U.S. Pat. No. 5,762,156 also to Bates et al., and also for a HYBRID ELECTRIC PROPULSION SYSTEM USING A DUEL SHAFT TURBINE ENGINE, and having essentially the same disclosure as the above; U.S. Pat. No. 5,765,656 to Weaver, for a HYBRID ELECTRIC MOTOR VEHICLE DRIVE; and U.S. Pat. No. 5,746,283 to Brighton, for an ELECTRIC PROPULSION SYSTEM FOR A VEHICLE. All of these U.S. patents disclose using electric motors, and in some cases uses more than one electric motor, one for each of at least two wheels; also, all of these typically include at least two sources of power for the electric motors, with one being a turbine, and more specifically a gas turbine except for the '283 patent, where the turbine is instead a wind turbine, and the other being either a fuel cell or a battery. The turbine typically drives an electric generator, which in turn drives the one or more electric motors or charges the electric power storage device—the fuel cell or battery—or does both, sometimes doing one under some driving conditions and doing the other under other driving conditions. For example, the electric motor-driven automobile disclosed in the '537 patent to the inventor of the present invention uses either a gas turbine driving an electric generator to provide electric current to a motor for each wheel, or a battery for the same purpose, and can use the output of the electric generator driven by the gas turbine to drive the battery.

Of the above-mentioned patents, besides the '537 patent to the inventor of the present invention, only the '234 patent to Rosen et al and the '283 patent to Brighton disclose a vehicle with more than one electric motor. The '234 patent to Rosen et al discloses a vehicle having a separate electric motor 18 for each of two rear wheels 16; each electric motor 18 is drivingly connected to a respective wheel 16 through a respective drive train 20. An automobile according to the '234 patent uses a gas turbine 26 to drive an electric generator 24 for providing electric power to the electric motors 18. Instead of always relying on electric power from the generator driven by the gas turbine, the electric motors attached to each wheel can receive current from a fuel cell 22. (A fuel cell is not recharged by electric current, and instead must be fueled with for example hydrogen or material from which hydrogen can be extracted.) The '234 patent also discloses using a flywheel 80 and possibly also a battery 82, both of which can be used for storing energy, including energy recovered for example during braking. A power controller 30 is responsive to a control or "demand" signal, such as an acceleration or brake signal caused by a driver, to regulate the electric motors 18. The power controller 30 controls the motor torque by regulating a delivery of hydrocarbon fuel and air to both the fuel cell 22 and the gas turbine 26. In low-load conditions, where the energy needed is less than the maximum electrical power output of the fuel cell 22, the power controller 30 causes the electricity needed by the motor to be generated by the fuel cell and by the gas turbine utilizing fuel cell exhaust gases. When the vehicle's power requirements exceed the output capacity of the fuel cell, the power controller causes additional hydrocarbon fuel and compressed air to be supplied to the gas turbine to generate additional power as needed by the vehicle up to a maximum sustainable power level.

As mentioned, the '283 patent to Brighton also discloses a vehicle with four electric motors 5, one for each wheel for applying torque to the wheel. Brighton discloses having each electric (propulsion) motor 5 connected to an axle 120 to drive its respective wheel 130. The motors 5 can be connected directly to the wheels 130 or can be connected through a speed control mechanism 140. Leads 105 connect to a main generator. Leads 150 connect to a power reserve module 102. A vehicle according to Brighton has a control device that diverts power from the main generator output to a stored power unit, such as a battery pack, to recharge and maintain the stored power unit when operating conditions permit.

Besides hybrid vehicles using turbine engines as one power source, major automobile manufacturers, including Honda and Toyota, are now developing gasoline-electric hybrid vehicles. In these cars, a transmission is turned by, under some conditions, both a gasoline engine and an electric motor, and the transmission then turns the wheels of the vehicle in the same way as is done conventionally. (Thus, for such hybrid vehicles, there is only one electric motor providing a driving force/torque for all of the drive wheels, of which there are always at least two.)

In all of the prior art known to the inventor, even though according to some of the prior art a vehicle may have an electric motor applying torque to one wheel and another electric motor applying torque to another wheel, there is no disclosure of a vehicle having what is here called a distributed electric motor arrangement, i.e. at least two electric motors acting under the control of a controller that in effect causes each motor to provide a torque coordinated with the torque applied by the other motors, in much the same way as a legged or winged animal coordinates commands to the muscles causing its legs or wings to move. Such an arrangement—having multiple, distributed motors—is more survivable than the present single-thread arrangement—one motor and one transmission—since whereas in the present arrangement if either the motor or the transmission fails, the vehicle stops, in a vehicle with a distributed motor, both engines and their respective transmissions would have to fail to stop the vehicle.

The prior art also teaches what has come to be known as "drive-by-wire" technology, which refers to a way of causing a vehicle to accelerate, brake, and turn without using mechanical linkages interfacing the driver and the vehicle drive assembly, but instead using electrical linkages, i.e. wires. However, such vehicles according to the prior art nevertheless use a single engine and transmission for applying torque to each of the drive wheels.

Thus, what is needed is a vehicle having a distributed motor/motor system, and ideally, a vehicle that would have a control system coupled to the motor elements in a way that is relatively highly unlikely to fail, compared to the mechanical linkages in automobiles according to the prior art.

SUMMARY OF THE INVENTION

Accordingly, in a first aspect of the invention, a motor vehicle is provided having a plurality of traction wheels (10a) and a plurality of steerable wheels suitable for travel along a roadway, the motor vehicle characterized in that it comprises: a distributed motor system comprising a plurality of electric drive motors each coupled to a respective traction wheel, each responsive to a respective drive power; and a controller, responsive to a signal indicating a desired change in speed or a desired change to or from a reverse direction of travel, and further responsive to a source of electrical power, and further responsive to a tachometer signal indicating a rotational speed of at least one of the traction wheels or at least one of the steerable wheels a wheel or of one of the electric drive motors, for providing the respective drive power for each of the plurality of electric drive motors so as to control the speed of the motor vehicle according to the signal indicating a desired speed or a desired change to or from a reverse direction of travel.

In accord with the first aspect of the invention, the motor vehicle may further comprise at least one steering motor, and wherein the controller is further responsive to a signal indicating a desired change in direction of travel of the vehicle, and provides corresponding steering power for the at least one steering motor.

Also in accord with the first aspect of the invention, the motor vehicle may further comprise a speed control interface, responsive to a speed control input by an operator of the motor vehicle indicating a desired change in speed or a desired change to or from reverse, for providing the signal indicating a desired change in speed or a desired change to or from a reverse direction of travel; and a turn interface, responsive to a turning input by an operator of the motor vehicle indicating a desired change in the orientation of any turnable wheels of the vehicle, for providing the signal indicating a desired change in direction of travel of the vehicle. Further, the controller may comprise: a speed control computer, responsive to the signal indicating a desired change in speed or a desired change to or from a reverse direction of travel, responsive to the source of electrical power, and further responsive to the tachometer signal indicating a rotational speed of at least one of the traction wheels or at least one of the steerable wheels, for providing the respective drive power for each of the plurality of electric drive motors, and for providing a tap of the electrical power for use as steering power; and a turning computer, responsive to the tap of the electrical power, responsive to the tachometer signal indicating a rotational speed of at least one of the traction wheels or at least one of the steerable wheels, and further responsive to the signal indicating a desired change in direction of travel of the vehicle, for providing the corresponding steering power.

Still also in accord with the first aspect of the invention, at least one electric drive motor may be included in a motor box also including a gear box coupled to a respective traction wheel, and wherein the motor box is shock-mounted to either the frame of the vehicle or to the body of the vehicle in case of a uni-body vehicle. Further, at least one electric drive motor may have windings made of material in a superconducting state.

Yet even still also in accord with the first aspect of the invention, the coupling of the electric drive motors to the traction wheels may include, for at least one of the traction wheels, a bull gear integral with the traction wheel and suitable for coupling with a primary drive gear of the respective electric drive motor. Further, the bull gear may be disposed at the periphery of the traction wheel rim and oriented toward the center of the traction wheel. Further still, the primary drive gear may be offset from the center of the traction wheel so as to provide a gear reduction.

Still even yet also in accord with the first aspect of the invention, the electric drive motors may be integral with wheel mounts for the respective traction wheels.

Yet still also in accord with the first aspect of the invention, at least some of the wheels of the vehicle may be turnably mounted to the vehicle, and, in addition, at least some of the wheels of the vehicle may be mounted so as to be movable en masse from one position to another relative to the vehicle, and the vehicle may further comprise means for moving en masse at least some of the wheels.

Still also in accord with the first aspect of the invention, at least one electric drive motor may be a pancake type of electric drive motor embedded in one of the traction wheels and coupled to the frame of the motor vehicle so as to be able to apply torque to the traction wheel.

Yet still also in accord with the first aspect of the invention, the tachometer signal may be provided by a shaft encoder.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
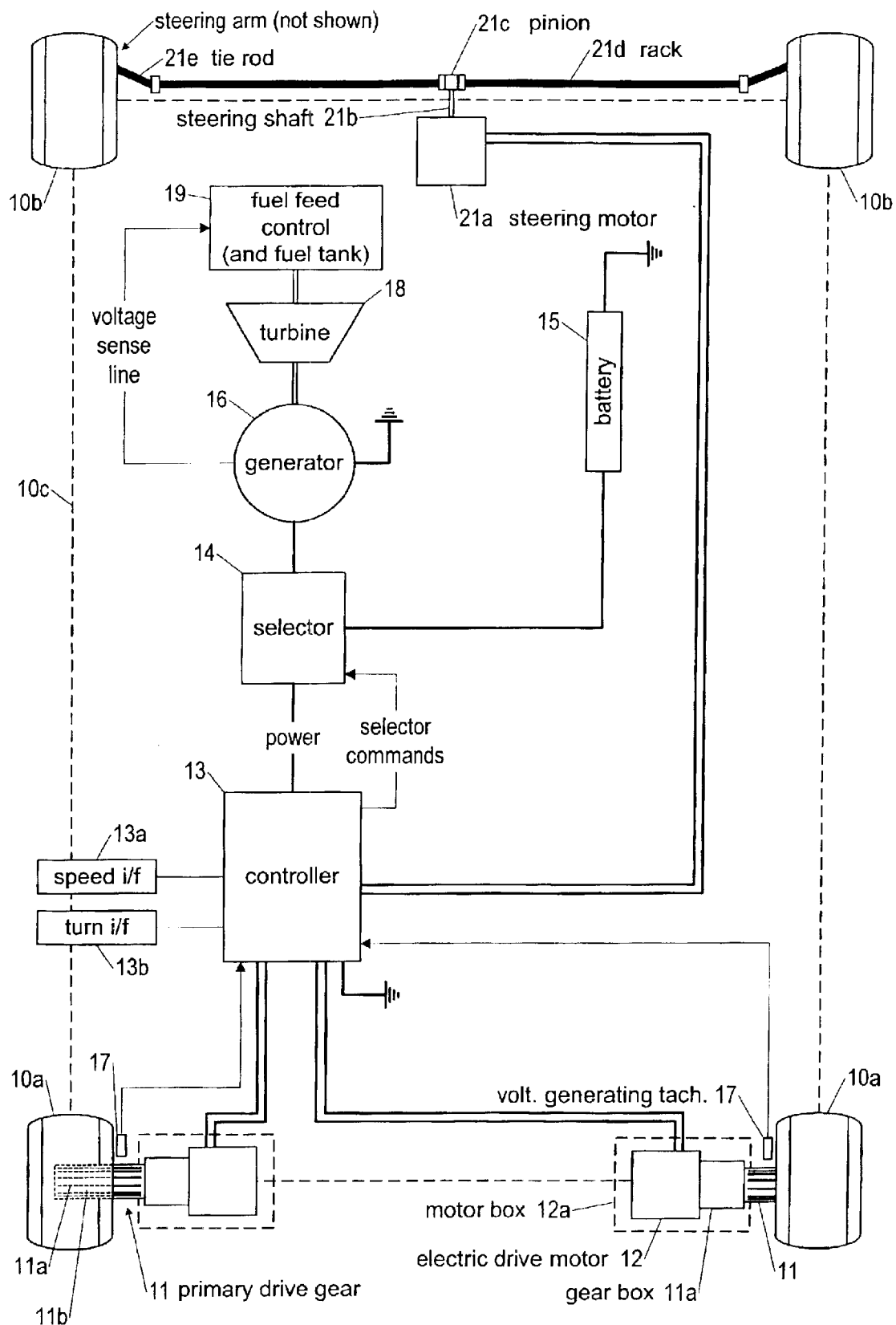
FIG. 1 is a schematic/block diagram of a vehicle according to an embodiment of the invention, and so including a controller and a plurality of electric drive motors, each coupled to a respective traction wheel and operative according to the controller.

The invention—a vehicle having a distributed motor/drive system with all components under the control of a (central) controller—provides a unique and different form of propelling a vehicle compared to any vehicle provided by the prior art. As will be appreciated from the description that follows, by virtue of providing a motor and gear arrangement for each driven (traction) wheel, the invention eliminates the need for a mechanical transmission and so eliminates the need for axles in a motor vehicle. In addition, in case of using electric drive motors, braking is provided by bucking or reversing the motors. Also, a gear arrangement is provided—including in some embodiments a bull gear as part of a driven/traction wheel and a primary drive gear turned by the motor for the traction wheel and preferably offset from the bull gear center to provide in effect a gear reduction—that is perfect for high speed operation and critical braking, and that allows easy replacement of a wheel (by simply slipping a replacement wheel onto the shaft about which the wheel is to turn and rotating the wheel until the bull gear teeth mesh with the teeth of the primary drive gear). In addition, four-wheel drive is readily inherent by virtue of having a motor for each traction wheel. Further, the invention allows using a separate (independent) rack and pinion steering arrangement for each wheel (with steering commands to each turnable wheel provided by the controller). As will also be appreciated, each wheel/motor/steering mechanism assembly can be provided as a single integrated unit, or a wheel/motor assembly can be provided as one integrated unit and a steering mechanism as another. The invention is also noteworthy in that, because of providing propulsion using more than one motor, in case of failure of one of the motors of a vehicle, the vehicle is still drivable; in other words, a vehicle according to the invention degrades more gracefully than a vehicle according to the prior art.

The invention is described here in case of embodiments commonly known as series hybrid car arrangements, i.e. arrangements in which a fuel-powered engine drives a DC generator, which in turn powers electric drive motors in combination making up a distributed drive motor for turning the wheels of a vehicle, each electric drive motor being connected to a respective wheel through a coupling normally including a planetary gear arrangement. However, it should be understood that nothing about the invention restricts it to such arrangements. The invention is of use whether electric motors are used as components of the distributed motor/drive system or some other kind of motors are used, including even gasoline engines, and regardless of whether a hybrid arrangement (more than one kind of power source) is used. In other words, the invention encompasses providing even a (non-hybrid type of) vehicle having a plurality of gasoline or alternative fuel engines (without any electric drive motors anywhere), one for each of at least two wheels, all under the control of a single controller, as described above. Thus, the invention also comprehends a distributed motor/drive system in which each element (at least two) is a parallel hybrid arrangement, i.e. an arrangement in which each wheel can be driven by both a fuel-burning/fuel-consuming engine and also an electric drive motor (via a transmission) at the same time, using e.g. a power split device as in the Prius parallel hybrid car, available from Toyota. (The Prius power split device is a gearbox having a planetary gear set; it hooks together the gasoline engine, the DC generator and the electric drive motor of the Prius, and makes possible providing torque to the wheels using the gasoline engine or the electric drive motor, or both.) However, in view of the complexity of non-electric motors compared to electric motors, complexity in both operation and manufacture, it is far preferable that each component of a distributed motor/drive system according to the invention use an electric motor.

Referring now to FIG. 1, an improved vehicle according to a preferred embodiment of the invention includes a pair of suitably-supported driven/traction wheels 10a, each traction wheel 10a being connected by way of a corresponding primary drive gear 11 and optional gear box 11a to a respective electric drive motor 12, in which case the motors may serve as part of a braking system, as by reversal of the motors (by e.g. reversing the leads of field coils within the motors, the leads residing within the controller 13). A variable speed DC motor of suitable power and having a 28-volt rating, or a 115 volt 400 cycle AC motor, or other, may be used. (In FIG. 1, pairs of heavy connecting lines indicate electrical buses that carry substantial current and also carry smaller current for signalling, and finer connecting lines indicate conductors that carry smaller current and are used only for signalling, typically via the voltage provided by the line compared to ground.) The gear box typically includes a planetary gear arrangement and automatically adjusts to a suitable gearing depending on the speed of the shaft (not shown) of the electric drive motor, so as to provide an appropriate speed of the primary drive gear 11.

Any other type of electric drive motor may be used besides the arrangement described above. For example, instead of an electric drive motor 12 disposed in spaced apart relation to a traction wheel 10a, a so-called pancake motor may be used, i.e. a motor embedded in the traction wheel but coupled to the frame of the vehicle so as to be able to exert torque on the traction wheel.

Motors 12 may be connected in parallel with one terminal of each of the motors being grounded and the other terminal connected to a controller 13, to permit controlling the speed of the motors 12 by varying the current to the motor, or both leads to the motor may be connected to the controller 13 via an electrical bus, as shown, in order to make possible switching the leads to the field coils and thereby reversing the motors. Motors 12 are connected through the controller 13 to a selector network 14 which alternatively connects motors 12 either to an accumulator or storage battery 15 or to a DC electric generator 16 based on selector commands provided by the controller 13. The controller 13 is responsive to the voltage generated by respective voltage-generating tachometers 17, one for each motor, and sends selector commands to the selector 14 based on the tachometer signals. Instead of voltage-generating tachometers, so-called shaft encoders may be used, in which case a voltage signal might also be provided indicating the shaft angle of rotation relative to some reference orientation. Based on the tachometer (or shaft encoder) signals, different selector commands may be provided in different embodiments. For example, in some embodiments, when the tachometer signal for a motor is above a predetermined level, the controller 13 sends a selector command to the selector 14 to connect the motor to the generator 16, but when the tachometer signal falls below the predetermined level, the controller sends a command to the selector 14 to connect the motor 12 to the battery 15.

Still referring to FIG. 1, generator 16 is driven by a gas turbine 18 to which fuel is fed by an adjustable fuel feed control 19 such as a fuel pump or the like, the fuel feed being regulated so as to maintain a constant generator voltage output, i.e. 28 volts in the present embodiment, as sensed by a voltage sense line as shown. Generator 16 is connected to battery 15 by way of the selector 14, acting autonomously, i.e. not under the command of the controller 13, to connect the output of the generator 16 to the battery 15 when the voltage of the latter falls below a predetermined level. A battery rectifier charger (not shown) is provided to permit the charging of battery 15 from a line alternating current generally available (e.g. at a residence), for example 110 or 220 volt AC, without actuation of the motor generator.

Considering now the operation of the improved vehicle, the gas turbine 18 is fired to drive the generator 16 and the speed of the gas turbine 18 is regulated (by adjusting the fuel fed to the turbine) so as to maintain a constant voltage output at the generator 16. The motors 12 are then energized by the generator 16 through the controller 13, based e.g. on signals received from a speed interface 13a responsive to a foot pedal position or a so-called joystick position, with in some embodiments the motors 12 being initially connected through the selector network 14 to battery 15 by reason of the low voltage generated by tachometer 17. When the vehicle reaches or exceeds a predetermined speed in such embodiments, for example 30 miles per hour, the voltage generated by tachometer 17 is sufficient to have the controller 13 send to the selector 14 commands to switch the motor from the battery 15 to the generator 16. Upon the vehicle 12 falling below the predetermined speed (for example 30 miles per hour), the motors 12 are switched back to batteries 15 in the selector 14 based on commands provided by the controller 13.

Still referring to FIG. 1, the controller 13 also provides current to a steering motor 21a in response to turning signals provided by a turn interface 13b responsive to e.g. a steering wheel orientation or a joystick position. In case of a joystick being used to control both speed and direction of travel, a single joystick may be used, with the operator of the improved vehicle pushing the joystick right or left to turn right or left, or more forward for higher speed in the forward direction, or more backward for higher speed in the reverse direction. In response to a signal from the turn interface 13b, the controller 13 provides power to at least one steering motor 21a, power it obtains via the controller 13. (Current is provided in one sense to turn in one direction, and in the other sense to turn in the other direction, i.e. the leads to e.g. field windings in the steering motor are reversed, as needed, within the controller 13 so as to cause turning in one direction or the other.) The steering motor 21a is coupled via a steering shaft 21b to a pinion 21b so as to be able to turn the pinion on a rack 21b of a (motorized) rack and pinion steering arrangement. As usual, the rack is attached to each of two steerable wheels 10b via a tie rod 21e attached in turn to a steering arm (not shown). In the embodiment shown in FIG. 1, the steerable wheels 10b are different from the traction wheels 10a. It should be noted, however, that the traction wheels 10a could also be made steerable in the same way. Also, other steering arrangements can be used besides rack and pinion steering arrangements, and for a truck or sport utility vehicle it is often preferable to use a recirculating-ball steering gear arrangement (based on a worm gear). Further, by providing for each steerable wheel a rack and pinion steering arrangement (or other steering arrangement) adapted for a single wheel as opposed to one tied to two wheels or even four wheels, as is usual (and as shown in FIG. 1 in case of tying two wheels together), so that the controller 13 provides power separately to each steerable wheel, and by having a distributed motor/drive system (i.e. separate motors coupled directly to each traction wheel), the invention allows a designer to choose where to locate wheels taking into account fewer constraints than must be taken into account in the prior art problem of designing a vehicle having a single engine coupled to two or more wheels by a single transmission. Of course in case of locating wheels in other than the usual corner locations of a vehicle frame, the vehicle suspension system must be modified. The disadvantage of having to design suspension systems suitable for new wheel arrangements is offset by the many advantages offered by the invention. In fact, the invention even allows the location of the wheels of a vehicle to move during operation of the vehicle, and so e.g. during a turn, the inside wheels could be moved toward the outside of the turn and thus reduce the work that would ordinarily be done by a suspension system in resisting rollover. (To understand why having the wheels on the inside of a turn move to the outside during the turn would be advantageous, imagine riding a bicycle and taking a turn; when you do, you lean in toward the turn, and so your wheels are in effect moving toward the outside of the turn relative to the vehicle and you.)

Ideally, each electric drive motor 12 and gear box 11a are provided as a single motor box 12a (FIG. 1) having cooling fins (not shown) and that is air or liquid shock-mounted to the frame of the vehicle (indicated by dashed line 10c), which is preferably a torsion bar frame. In case of a so-called uni-body vehicle, the motor box is preferably shock-mounted to the body.

Although other couplings are also envisioned, one simple coupling of the primary drive gear 11 to its traction wheel 10a is accomplished by providing as the primary drive gear 11 a spindle gear (a shaft with protuberances 11a and depressions 11b oriented along the shaft and serving as the teeth of a gear, as illustrated in FIG. 1) that fits into a bull gear 22 (indicated in FIG. 1A and described below) in the periphery of the traction wheel 10a and having protuberances and depressions corresponding to the spindles of the primary drive gear 11. In such an arrangement there is no gear reduction from the motor box 12a to the traction wheel 10a, i.e. for each revolution of the primary drive gear 11 there is a corresponding revolution of the bull gear (and so also the traction wheel 10a). Preferably, in the primary assembly stage, the bull gear and traction wheel are provided as a single cast piece or are otherwise formed as a single piece; in other words, the traction wheel and bull gear, as an assembly, are primarily constructed as an integral unit.

Figure 1A:
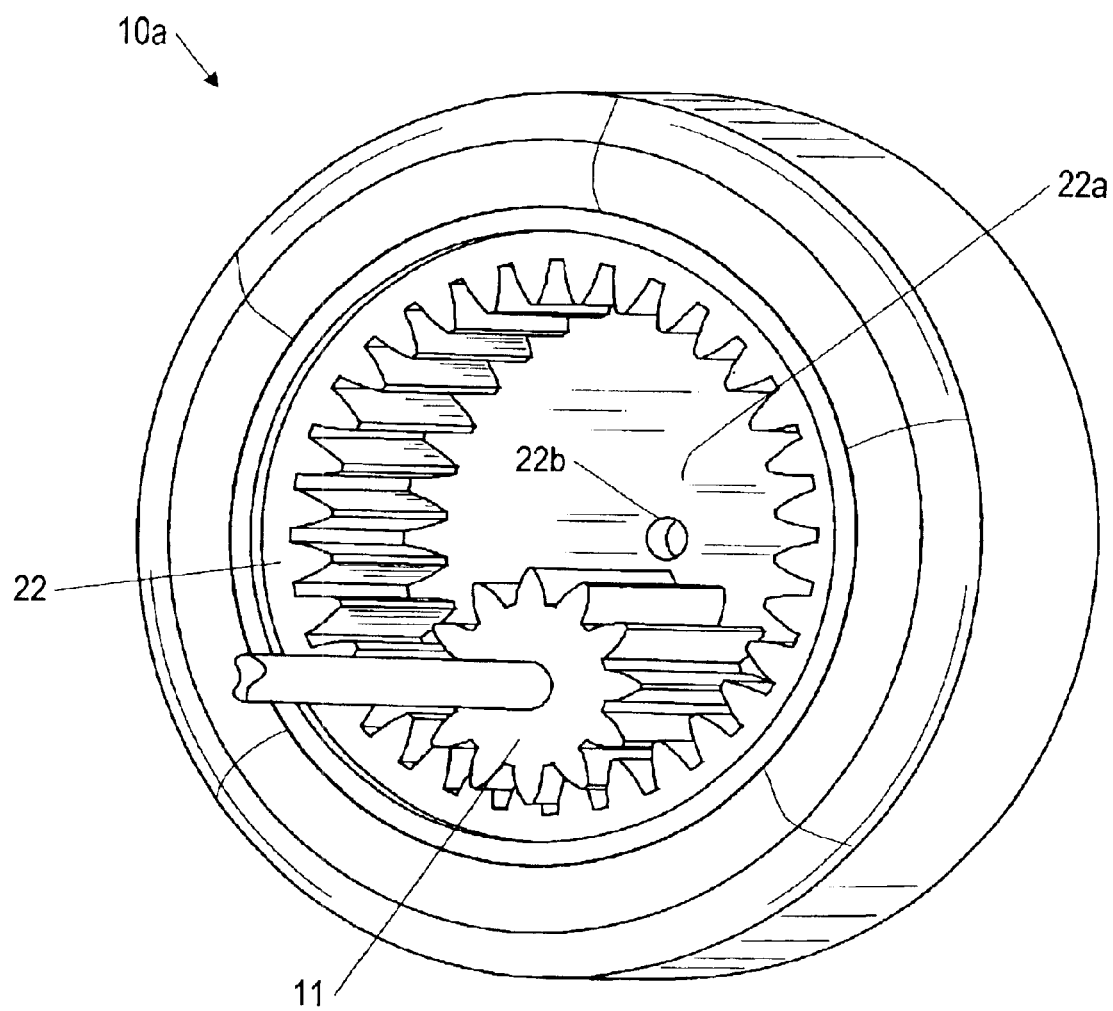
FIG. 1A is a perspective drawing of an embodiment of a traction wheel having an integral bull gear and driven by a primary drive gear in a way that provides a gear reduction.

Referring now to FIG. 1A, in an alternative coupling of a primary drive gear 11 from a motor box 12a to a traction wheel 10a having a bull gear 22, a gear reduction from the motor box 12a to the traction wheel 10a is provided by using a smaller, offset primary drive gear that therefore turns several times for each revolution of the traction wheel 10a. The bull gear 22 is disposed at the periphery of the (rim of the) traction wheel 10a with the gear teeth pointing toward the center of the wheel, and the wheel 10a rotating on a shaft (not shown) rotatably attached to a wheel mount (not shown) attached to the frame 10c of the vehicle and piercing a center face 22a behind the bull gear 22 through an opening 22b. The wheel 10a is held onto the shaft by a lug nut or other fastener at the end of the shaft protruding from the outside (away from the vehicle side) of the wheel 10a.

Also, as is mentioned above, a steering arrangement such as rack and pinion steering is preferably provided for each steerable wheel, i.e. without a rack connecting wheels together, and each such steering arrangement is preferably attached to a respective motor box, preferably on the underside of the motor box. As mentioned, the controller 13 coordinates the turning of the different wheels and so stands in place of e.g. the rack in a rack and pinion steering arrangement. Also preferably, each electric drive motor uses for its windings material in a superconducting state, material that is superconducting at or near normal ambient temperatures, thus allowing a smaller motor for a desired power rating.

Figure 2:
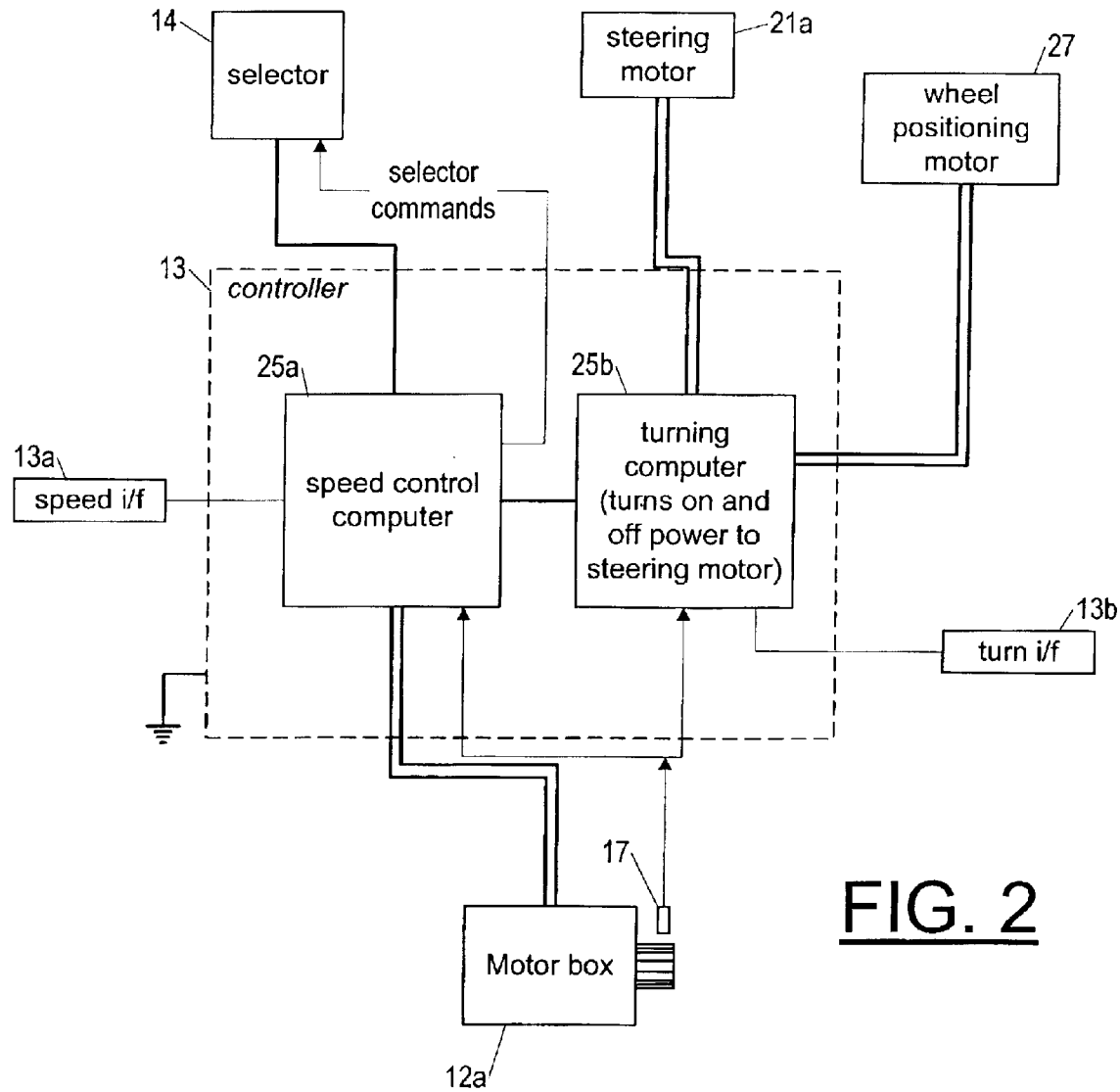
FIG. 2 is a schematic/block diagram of the controller and elements to which it is coupled, and including a wheel positioning element in addition to the elements of FIG. 1.

Referring now to FIG. 2, a block diagram of the controller 13 is shown as including a speed control computer 25a and a turning computer 25b, both receiving signals from preferably at least one voltage-generating tachometer 17 (coupled to a respective traction wheel 10a, as in FIG. 1) or other sensor or sensors indicating either the actual wheel speed or the electric drive motor speed or both. The speed control computer uses the signal from the tachometer 17 as feedback (useful e.g. in case of a motor problem), and the turning computer 25b uses the tachometer 17 to e.g. prevent oversteering the vehicle at high speeds, or in case of steering all four wheels, changing how the back wheels are steered for a turn compared to the front wheels. (Typically, at higher speeds, if both the front and rear wheels are being turned, the rear wheels are turned in the same direction as the front wheels, but at lower speeds, the rear wheels are turned in the opposite direction.) The turning computer 25b also provides power to the steering motors 21a by virtue of its being connected to the speed control computer 25a; chopper circuits (not shown) inside turning computer 25b are used to provide more or less power to the steering motors, as needed. The speed computer 25a also uses chopper circuits (not shown) to regulate the current/power provided to the electric drive motors 12 within the respective motor boxes 12a. Also, in case of series hybrid vehicle embodiments as indicated in FIG. 1, the speed control computer 25a issues selector commands to the selector module 14 to switch from one power source to another, depending on conditions, including e.g. how fast the vehicle is traveling and the torque required to respond to the input by the vehicle operator for acceleration or braking. In addition, in case of an input from the operator signalling braking, the speed control computer adjusts how power is provided to the electric drive motors 12 by e.g. switching the field windings leads (not shown) located inside the speed control computer, so as to alter the direction of current within the field winding in the respective electric drive motor 12. Finally, the speed control computer effects energy savings within the vehicle during braking by sending selector commands so that the power flowing back from the generators is provided to the battery/accumulator 15 (FIG. 1) or other stored electrical (as opposed to chemical) energy source.

In case of embodiments in which in addition to being able to turn some of the wheels 10a 10b, some are also able to be moved en masse relative to the vehicle, i.e. as opposed to simply being turned, not only would the turning computer 25b provide steering power to at least one steering motor 21a, but it would also provide wheel positioning power to a wheel positioning motor 27 coupled to the wheel mount (not shown) that would in turn be movably attached to the vehicle, thus allowing at least some of the wheels 10a 10b to be moved en masse in a turn, typically by only a few inches, depending on the size of the vehicle and the rate of turn.

Figure 3:
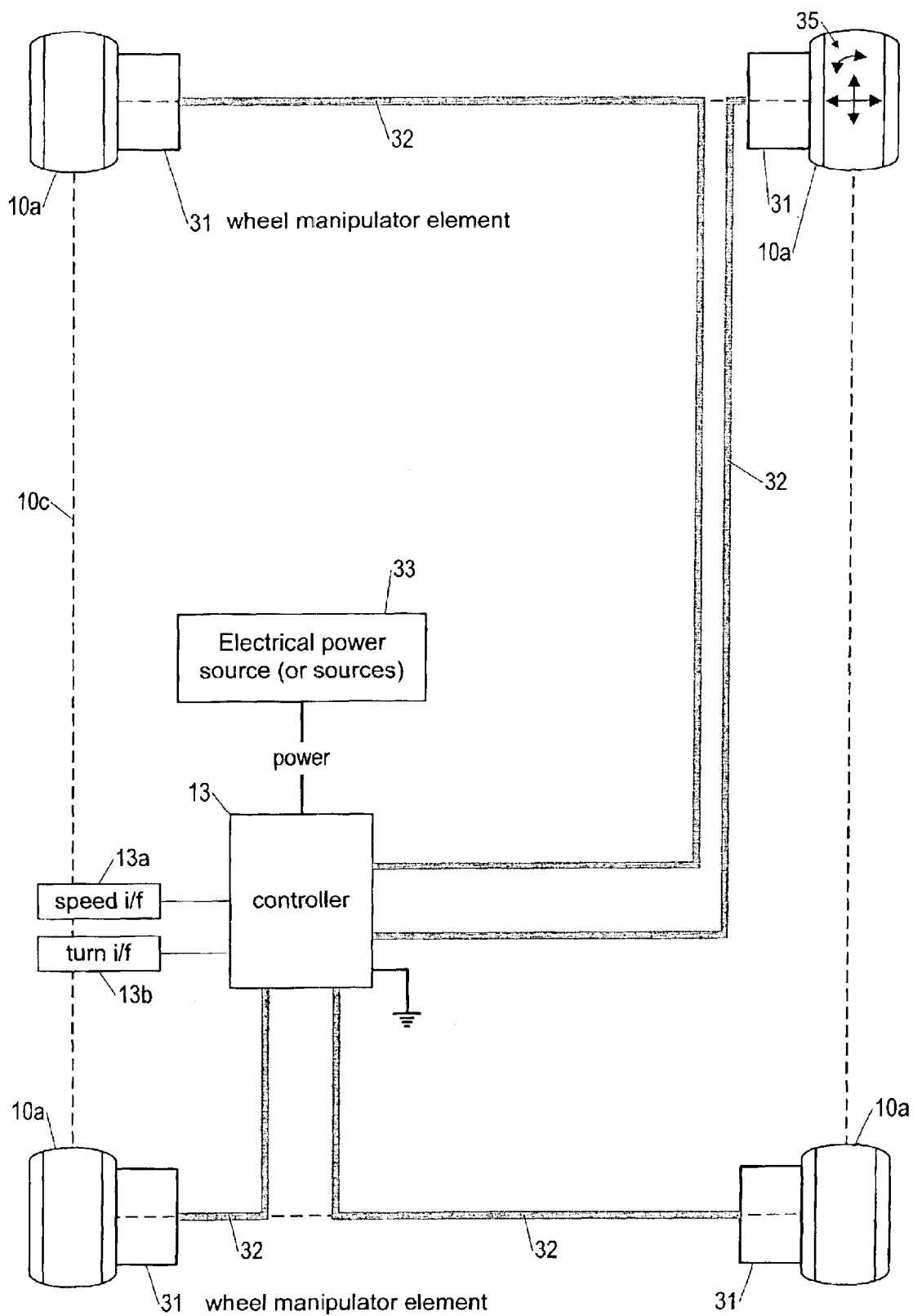
FIG. 3 is a schematic/block diagram of a vehicle according to another embodiment of the invention, one in which four motors are provided, each for a respective traction wheel, and each part of a (traction) wheel manipulator element that provides not only for driving a wheel, but also for turning the wheel and possibly repositioning the wheel relative to the vehicle frame.

Referring now to FIG. 3, a vehicle according to the invention is shown as having a wheel manipulator element 31 for each of four drivable wheels 10a, with the wheel manipulator element including both the motor box 12a (FIGS. 1 and 2) and the wheel positioning motor 27 (FIG. 2). Each wheel manipulator element 31 is shown coupled to the controller 13 for both power and signaling by cables 32. The controller 13 is shown receiving electrical power from one or more sources 33 of electrical power, such as a mechanical and chemical source in series or in parallel. Thus, according to the invention, a vehicle may include four wheels each of which is a drive wheel, and each of which is both steerable and able to be repositioned with respect to the frame 10c of the vehicle, as indicated by arrow-terminated lines 35 for one of the wheels in FIG. 3.

It is to be understood that the above-described arrangements are only illustrative of the application of the principles of the present invention. Numerous modifications and alternative arrangements to those described above may be devised by those skilled in the art without departing from the scope of the present invention, and the appended claims are intended to cover such other modifications and arrangements.

What is claimed is:

1. A motor vehicle having a plurality of traction wheels (10a) and a plurality of steerable wheels (10b) suitable for travel along a roadway, the motor vehicle characterized in that it comprises:

a distributed motor system comprising a plurality of electric drive motors (12) each coupled to a respective traction wheel (10a), each responsive to a respective drive power;

a controller (13), responsive to a signal indicating a desired speed or a desired change to or from a reverse direction of travel, further responsive to a source of electrical power, and further responsive to a tachometer signal indicating a rotational speed of a wheel (10a 10b) or of one of the electric drive motors (12), for providing the respective drive power for each of the plurality of electric drive motors (12) so as to control the speed of the motor vehicle according to the signal indicating a desired speed or a desired change to or from a reverse direction of travel; and means for controllably repositioning at least one of the wheels (10a 10b) closer to or farther from at least one of the other wheels (10a 10b);

wherein at least one electric drive motor (12) is included in a motor box (12a) also including a gear box (11a) coupled to a respective traction wheel (10a), wherein the motor box (12a) is shock-mounted to the vehicle.

2. The motor vehicle of claim 1, further comprising at least one steering motor (21a), and wherein the controller (13) is further responsive to a signal indicating a desired change in direction of travel of the vehicle, and provides corresponding steering power for the at least one steering motor (21a).

3. The motor vehicle of claim 2, wherein the controller (13) comprises:

a speed control computer (25a), responsive to the signal indicating a desired change in speed or a desired change to or from a reverse direction of travel, responsive to the source of electrical power, and further responsive to the tachometer signal indicating a rotational speed of at least one of the traction wheels (10a) or at least one of the steerable wheels (10b), for providing the respective drive power for each of the plurality of electric drive motors (12), and for providing a tap of the electrical power for use as steering power; and a turning computer (25b), responsive to the tap of the electrical power, responsive to the tachometer signal indicating a rotational speed of at least one of the traction wheels (10a) or at least one of the steerable wheels (10b), and further responsive to the signal indicating a desired change in direction of travel of the vehicle, for providing the corresponding steering power.

4. The motor vehicle of claim 1, further comprising:

a speed control interface (13a), responsive to a speed control input by an operator of the motor vehicle indicating a desired change in speed or a desired change to or from reverse, for providing the signal indicating a desired change in speed or a desired change to or from a reverse direction of travel; and a turn interface (13b), responsive to a turning input by an operator of the motor vehicle indicating a desired change in the orientation of any turnable wheels of the vehicle, for providing the signal indicating a desired change in direction of travel of the vehicle.

5. A motor vehicle as in claim 1, wherein the vehicle is either a type of vehicle having a frame and a body or is a uni-body type of vehicle having only a body, and further wherein the motor box (12a) is shock-mounted to either the frame (10c) of the vehicle or to the body of the vehicle in case of a uni-body vehicle.

6. The motor vehicle of claim 5, wherein at least one of the electric drive motors (12) has windings made of material in a superconducting state.

7. The motor vehicle of claim 1, wherein for at least one of the traction wheels (10a) the coupling of the electric drive motors (12) to the traction wheels (10a) includes a bull gear (22) integral with the traction wheel (10a) suitable for coupling with a primary drive gear (11) of the respective electric drive motor (12).

8. The motor vehicle of claim 7, wherein the traction wheel has a rim portion and the bull gear (22) is disposed at the periphery of the rim and oriented toward the center of the traction wheel (10a).

9. The motor vehicle of claim 8, wherein the primary drive gear (11) is offset from the center of the traction wheel (10a) so as to provide a gear reduction.

10. The motor vehicle of claim 7, wherein the bull gear and traction wheel are primarily constructed as a single piece.

11. The motor vehicle of claim 1, wherein the electric drive motors (12) are integral with wheel mounts for the respective traction wheels (10a).

12. The motor vehicle of claim 1, wherein at least some of the wheels (10a 10b) of the vehicle are turnably mounted to the vehicle, and, in addition, at least some of the wheels (10a 10b) of the vehicle are mounted so as to be movable from one position to another relative to the vehicle, and the vehicle further comprises means (27) for moving at least some of the wheels (10a 10b).

13. A motor vehicle as in claim 1, wherein at least one electric drive motor (12) is a pancake type of electric drive motor embedded in one of the traction wheels (10a) and coupled to the frame (10c) of the motor vehicle so as to be able to apply torque to the traction wheel (10a).

14. A motor vehicle as in claim 1, wherein the tachometer signal is provided by a shaft encoder.

15. A motor vehicle having a plurality of traction wheels (10a) and a plurality of steerable wheels (10b) suitable for travel along a roadway, comprising:

a distributed motor system comprising a plurality of electric drive motors (12) each coupled to a respective traction wheel (10a), each responsive to a respective drive power, wherein at least some of the wheels are turnably mounted to the vehicle;

a controller (13), for providing the respective drive power for each of the plurality of electric drive motors (12) so as to control the speed of the motor vehicle; and means (27) for controllably repositioning at least one of the wheels (10a 10b) closer to or farther away from at least one of the other wheels (10a 10b);

thereby providing that at least some of the wheels (10b) are turnable and also that at least one of the wheels (10a 10b) is repositionable relative to the vehicle.

* * * * *